United States Patent [19]
Kolev

[11] Patent Number: 5,946,619
[45] Date of Patent: Aug. 31, 1999

[54] SYSTEM AND METHOD FOR IMPROVED PAGING AND LOCATION UPDATING OF MOBILE SUBSCRIBERS

[75] Inventor: Javor Petrov Kolev, Durham, N.C.

[73] Assignee: Ericsson Inc, Research Triangle Park, N.C.

[21] Appl. No.: 08/740,699

[22] Filed: Nov. 1, 1996

[51] Int. Cl.⁶ .................................................. H04Q 7/20
[52] U.S. Cl. .......................... 455/432; 455/433; 455/435
[58] Field of Search ................................ 455/426, 422, 455/432, 433, 435, 456, 517, 553, 552

[56] References Cited

U.S. PATENT DOCUMENTS

| | | | |
|---|---|---|---|
| 4,876,738 | 10/1989 | Selby ........................................ | 455/435 |
| 5,276,905 | 1/1994 | Hurst et al. .............................. | 455/435 |
| 5,361,396 | 11/1994 | Onoe et al. ............................... | 455/435 |
| 5,448,623 | 9/1995 | Wiedemann et al. ..................... | 455/430 |
| 5,561,840 | 10/1996 | Alvesalo et al. .......................... | 455/433 |
| 5,564,076 | 10/1996 | Auvray ...................................... | 455/76 |
| 5,588,043 | 12/1996 | Tiedemann, Jr. et al. ............... | 455/435 |
| 5,619,552 | 4/1997 | Karppanen et al. ...................... | 455/433 |

FOREIGN PATENT DOCUMENTS

| | | |
|---|---|---|
| 0 260 763 A2 | 9/1987 | European Pat. Off. . |
| 0 544 448 A2 | 11/1992 | European Pat. Off. . |
| 0 702 497 A2 | 9/1995 | European Pat. Off. . |
| 0 756 433 A1 | 2/1996 | European Pat. Off. . |
| WO 93/07566 | 9/1992 | WIPO . |
| WO 96/29838 | 3/1995 | WIPO . |
| WO 96/34503 | 4/1996 | WIPO . |

OTHER PUBLICATIONS

Cox, Donald C.; Wireless Personal Communications:What Is It?; IEEE Personal Communications, vol. 2, No. 2, Apr. 1995,pp. 20–35.

Miller, Barry; Satellites Free the Mobile Phone;IEEE Spectrum, vol. 35, No. 3, Mar. 1998, pp. 26–35.

*Primary Examiner*—Nguyen Vo
*Attorney, Agent, or Firm*—Jenkens & Gilchrist

[57] ABSTRACT

A system and method for maintaining the home and visiting location records of a subscriber in a single-, dual- or multi-mode telecommunications system. Upon leaving the home system, an associated record is made of the new location within the visiting system, and a timer initiated. Paging of the subscriber is routed according to the presence of the associated record and unexpired timer, indicating the visiting system, and expired timer, indicating return to the home system.

72 Claims, 3 Drawing Sheets

SYSTEM AND METHOD FOR IMPROVED PAGING AND LOCATION UPDATING OF MOBILE SUBSCRIBERS

BACKGROUND OF THE INVENTION

1. Field of the Invention

The present invention relates generally to a telecommunications system and method for improved location updating and paging, particularly, to a telecommunications system and method for improved location updating and paging of subscribers within a single-, dual- or multi-mode telecommunications system.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

Numerous telecommunications systems have been designed to implement wireless telephony, e.g., the Advanced Mobile Phone Service (AMPS) cellular system in the United States, the Nordic Mobile Telephone (NMT) system in Northern Europe, and more recently the Global System for Mobile Communications (GSM) and DCS 1800 digital systems. All of the above systems are terrestrial systems, i.e., having earth-based as opposed to satellite-based transmissions.

The Association of SouthEast Asian Nation's (ASEAN) Cellular Satellite (ACeS) system is such a satellite-based Digital Mobile Satellite (DMS) system providing telephone coverage by use of a geo-stationary satellite. Although still in the specification stage, ACeS is essentially an adaption of the popular GSM specification. Expected to be deployed over SouthEast Asia, ACeS would provide coverage to areas having limited land-line and cellular infrastructures, allowing use of hand-held pocket phones across Asia. When deployed, the satellite footprint of the ACeS system will allow service from India to Japan and from Northern China to Indonesia using a large number of spot beams.

In geographical areas covered by both an earth-based and by a satellite-based system, the subscribers to a terrestrial system, such as GSM, and a satellite system, such as ACeS, may need to switch to the other "mode" of transmission. Accordingly, the subscribers' mobile phones need to have dual-mode capability to operate in and switch between the two modes of the two systems. For example, in a satellite-based system such as ACeS, the mobile unit may be taken into a large building or other structure or tunnel which interferes with or blocks satellite communication. If it is a dual-mode device, the mobile phone can detect a signal interference problem and automatically switch to the terrestrial system offering a better signal. Conversely, a GSM user may switch to ACeS in those areas, e.g., undeveloped areas, with poor infrastructures to support GSM transmissions. Interworking pairs of terrestrial-based and satellite-based systems, such as GSM and ACeS, advantageously offer such dual-mode capability. A problem has arisen, however, in the interworking between these diverse systems as a result of the attempts by ACeS' designers to adhere to GSM standards.

One of these problems is that upon transfer from one system to the other, e.g., from ACeS to GSM, the GSM system does not handle the subscription record of the ACeS subscriber any differently than that of a GSM subscriber. Thus, instead of distinguishing the visiting mobile user as a non-GSM user, the GSM system treats the visiting ACeS subscriber and their mobile registration information as an extension of the GSM system, and, in accordance with GSM protocol, location update information is transmitted back to the ACeS system, overwriting the mobile registration therein with GSM location information. Since the ACeS registration information has been deleted, upon return of the mobile from GSM to ACeS, re-registration in the ACeS system is necessary with the requisite exchange of information between the mobile and other earth-based equipment through the orbiting satellite, causing delay and increased signal traffic within ACeS. Such generated location update traffic, however, has the capacity to exceed the estimated signaling capability of the ACeS network, and would place a serious load on the whole system. If, alternatively, location update traffic is restricted, the mobiles would then be out of reach and the paging performance of the ACeS or other such satellite network poor.

This problem is exacerbated by the fact that GSM is an established system, making any modifications thereto difficult, unconventional and costly. Since DMS systems, such as ACeS, are still in the specification and development stage, however, solutions to this and other interworking problems are better handled by modifications to these presently more flexibly defined DMS systems.

Additionally, because of the aforementioned communications difficulties within DMS systems, subscribers in single-mode systems such as ACeS may encounter the same problems along location or service area borders within ACeS, whereby excessive non-speech over-the-air traffic may overload the system.

Accordingly, it is an object of the present invention to modify DMS systems, such as the presently developed ACeS system, to ameliorate or overcome the aforedescribed signal traffic problems caused by increased location updates.

It is an additional object of the present invention to modify DMS systems, such as ACeS, to decrease location updates by maintaining a second location address of an ACeS subscriber, where the home location or service area of the subscriber is preserved while the subscriber visits another location or service area within the DMS or other system where non-speech over-the-air traffic must be limited.

It is a further object of the present invention to decrease location updates by maintaining dual location addresses of a subscriber in a dual-mode telecommunications system, such as a satellite-based ACeS and earth-based GSM pair, where the home address of the subscriber in their home system is preserved while the subscriber visits the other system.

SUMMARY OF THE INVENTION

The present invention is directed to a system and method for maintaining the home and visiting location records of a subscriber in a single-, dual- or multi-mode telecommunications system. Upon leaving the home system, an associated record is made of the new location within the visiting system, and a timer initiated. Paging of the subscriber is routed according to the presence of the associated record and unexpired timer, indicating the visiting system, and expired timer, indicating a possible return to the home system.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
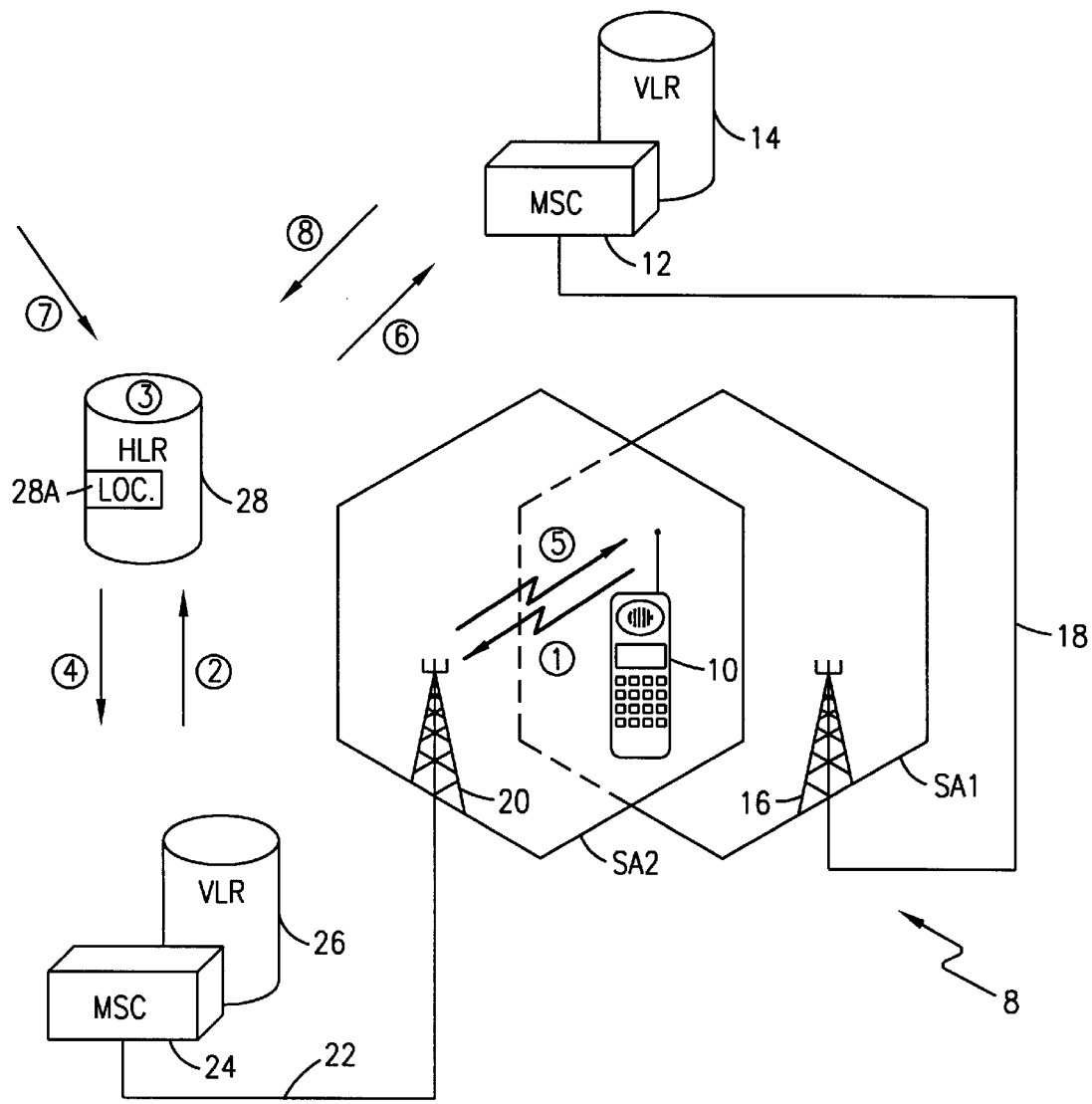
FIG. 1 is a block diagram of a conventional dual-mode telecommunications system and method.

With reference now to FIG. 1 of the drawings, there is illustrated a conventional telecommunication system 8 offering dual-mode capability between two different networks, i.e., a first Service Area (SA1) pertaining to a first digital communications network and a second Service Area (SA2) pertaining to a second and different digital communications network. For example, the first network SA1 may be a satellite-based system such as ACeS and the second network SA2 may be a terrestrial-based system such as GSM. It should, of course, be understood that the two networks are preferably substantially co-terminus, i.e., they overlay and complement one another, e.g., the footprint of the ACeS system substantially covers the same geographic territory (or a discrete portion thereof) of the GSM infrastructure, and a dual-mode subscriber, having the requisite dual-mode telephone, may switch therebetween. It should further be understood that the two "networks" may instead constitute two different service areas or other such geographical divisions within a given system, e.g., two service areas of a satellite-based system or an earth-based system, as will be described more fully hereinafter.

With further reference to FIG. 1, there is shown a mobile station 10, such as a dual-mode cellular phone, which has switched from operating within the first digital network SA1 (ACeS) to the second network SA2 (GSM). It is understood that while within SA1 or ACeS mobile 10 communicated with the first network SA1 through at least one Mobile Services Switching Center (MSC), therein, such as MSC 12, and its associated Visitor Location Register (VLR) 14. In particular, mobile 10 communicated with a base station 16 within the SA1 network and across a link 18 to the MSC 12 and VLR 14, which is a database containing information about all subscribers currently located and active within its service area, e.g., SA1 or a portion thereof such as a plurality of conventional location areas and cells therein.

After the switch or transfer to SA2 (GSM), as shown in FIG. 1, the mobile 10 no longer communicates with the first network SA1 (ACeS) and instead communicates, through another base station 20 and link 22, to another MSC 24 and VLR 26 associated with the GSM network. It should be understood that mobile 10 communicates with the base stations over the air via a satellite (not shown) in the case of the ACeS base station 16, and directly to the GSM base station 20, as shown in the figures.

In the dual-mode system 8, one or several Home Location Registers (HLR) 28 maintain a database of information about all registered subscribers in the system, i.e., all subscribers within the dual, co-terminus SA1 and SA2 networks. Accordingly, user profiles, current subscriber location, and other information are stored within a given HLR 28 for every dual-mode subscriber. It should be understood that in a single-mode embodiment of the present invention, the HLR 28 database contains information on all subscribers within the single-mode but multi-service area system. With reference again to FIG. 1 for example, prior to switching to SA2 (GSM), the HLR 28 contained a field within the registration information about the subscriber's current and last-known location, i.e., the geographic location within ACeS, about how to contact the mobile station 10 of the subscriber within the ACeS network. This subscriber location information is preferably stored within the HLR 28 in a location record 28A therein, shown in FIG. 1. Upon the switch, this information must of course be modified so that contact with the mobile 10 is maintained.

It should also be understood that the VLRs 14 and 26, each linked to one or more MSCs, temporarily stores subscription data for those subscribers currently situated in the service area of the corresponding MSC(s), as well as holding data on their location at a more precise level than the HLR 28.

It should also be understood that when the mobile station 10 first connects to the MSC 24/VLR 26 pair of the SA2 network, the VLR 26 verifies data about the particular subscriber from his home location register, i.e., from HLR 28 in FIG. 1. VLR 26 simultaneously updates the HLR 28 as to the current location of the mobile station 10 within the respective network, SA2 or ACeS. This Location Update (LU) request is forwarded by the VLR 26 to the HLR 28, which then updates its record, including location record 28A, for that subscriber accordingly. Preferably, the update location information sent to the HLR 28 contains the MSC 24/VLR 26 identity, i.e., an indication of the particular geographic Service Area of the operator providing the service, which is then stored in the location record 28A within HLR 28. Normally, the new Service Area Information (SAI) overwrites the old SAI data stored in record 28A in HLR 28.

With further reference to the conventional telecommunication system 8 shown in FIG. 1, a series of numbers are depicted each representing a corresponding step, as will be described hereinafter. The mobile station 10, upon switching to the new service area SA2, recognizes the change and initiates an update request (circled step 1 as illustrated). Base station 20 receives the transmitted request and forwards it to the MSC/VLR servicing the area, MSC 24 and VLR 26, for processing. After determining that the mobile station 10 is new to the region controlled by the MSC 24/VLR 26, i.e., that subscriber is not currently located and active within the region covered by that MSC/VLR, VLR 26 forwards the update request, including the LU therefor, to the HLR 28 (circled step 2 as illustrated). The HLR 28 then processes the update request and overwrites the "old" SAI in record 28A, i.e., the service area identity within the previously used SA1 (GSM) network, with the new SAI for the SA2 (ACeS) network (step 3 as illustrated). Acceptance of the update request is then forwarded by the HLR 28 back to the MSC 24/VLR 26 (step 4 as illustrated), to the base station 20 and then to the mobile station 10 (step 5 as illustrated).

The HLR 28 also informs the "old" MSC/VLR, i.e., MSC 12 and VLR 14 of the SA1 (GSM) network, of the mobile station's 10 change to the new MSC/VLR (step 6 as illustrated) and to cancel the subscriber information therein. It should be understood that switches as discussed above, i.e., from a GSM network to an ACeS network, are treated the same as switched between discrete cells or location areas within a GSM system, and the duality between the two modes in the dual-mode system shown in FIG. 1 is supported by ACeS' close adherence to GSM standards.

Accordingly, in the case of the conventional dual-mode telecommunications system 8 shown in FIG. 1, the mobile station 10 is now paged only within the region specified within the record 28A of the HLR 28 (and information within VLR 26), i.e., an incoming call is processed within the new area or SA2 only (step 7 as illustrated). It should therefore be understood that although the subscription may be dual, paging is limited to only one of the dual systems at one time, particularly, to the subscriber address stored in location record 28A. As far as the system 8 is concerned, the subscriber can only be in the particular system specified in record 28A and no paging is performed in the alternate dual system associated therewith.

Also, upon the return of the mobile station 10 to the original service area, i.e., SA1, the "old" subscriber information in the HLR 28 and in the MSC 12/VLR 14 is gone, having been cancelled in response to the HLR's 28 notice of change (the aforedescribed step 6). Thus, the mobile station 10 must resubscribe to the SA1 (GSM) network to be reachable therein (and unsubscribed to SA2). This, of course, means that the HLR 28 must utilize a geographically local MSC/VLR, which may be the original MSC 12 and VLR 14, which will again update the location record 28A within the HLR 28, as described above, by forwarding the appropriate SAI (step 8 as illustrated). In this manner, mobile station 10 is now reachable only within the SA1 (or GSM) network.

It is, therefore, apparent that subscribers within a dual-mode telecommunications system 8 may create a large amount of location update traffic under various circumstances and, as discussed, may even overwhelm the more limited signaling capacity of an ACeS system. Heretofore, this compatibility problem has not been addressed and no one has set forth a solution to this problem until now. The subject matter of the present invention is, accordingly, directed to this very solution. Also, because the aforementioned limitations on the signal capacity may be present within a single-mode DMS system, the subject matter of the present invention is also directed to this problem as well.

Figure 2:
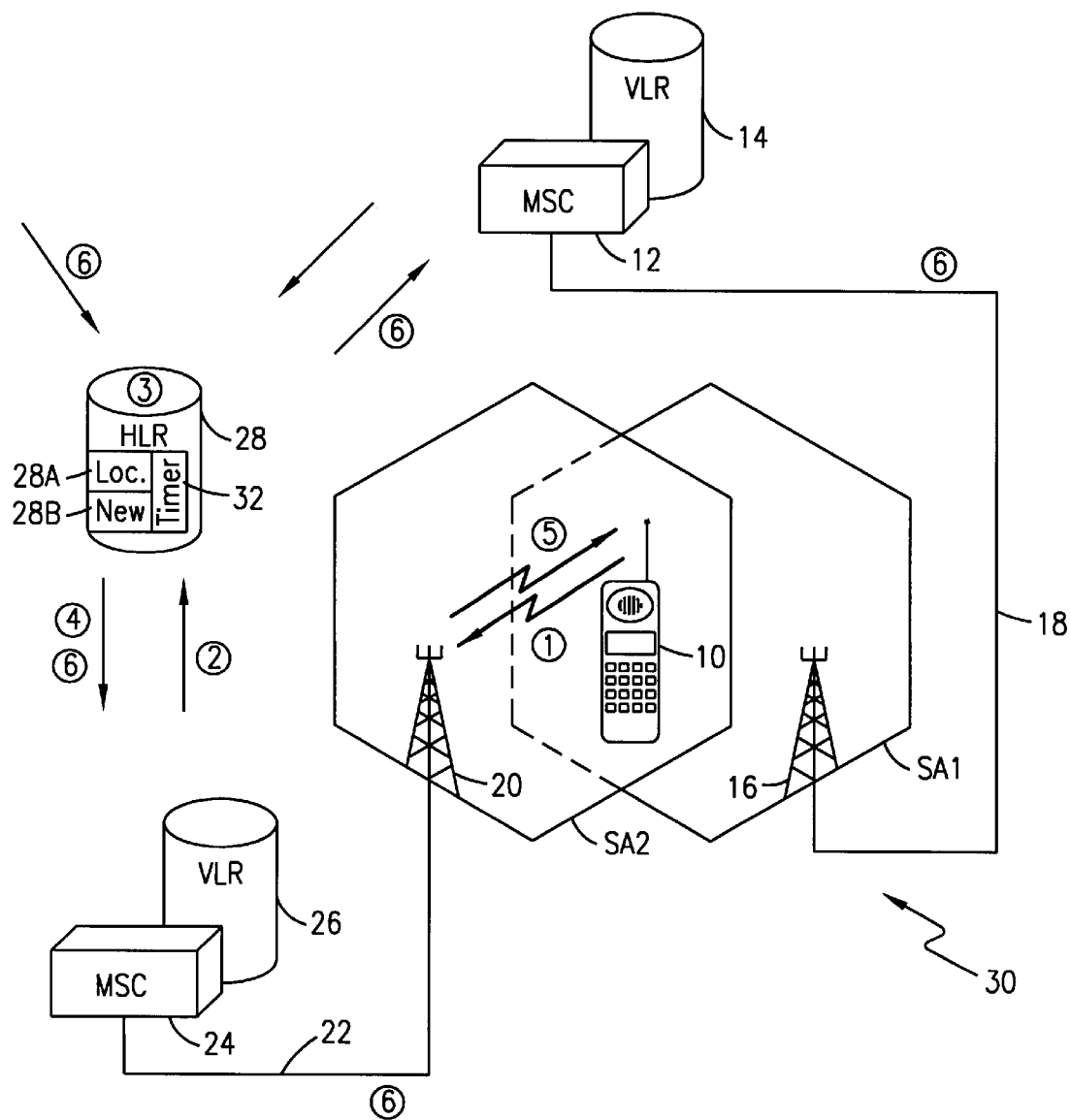
FIG. 2 is a block diagram of a dual-mode telecommunications system and method in accordance with the present invention which is different from FIG. 1 in that dual location records and a timer are maintained in the home location register for each subscriber.

Shown in FIG. 2 is an improved telecommunication system 30, similar to the dual-mode system 8 shown in FIG. 1 and sharing many reference numbers therewith. Instead of completely overwriting the "old" subscription record, particularly, the SAI of the previous system, however, the HLR 28 according to the present invention maintains the old SAI so that when the user returns, such as to their home or subscribed-to system, re-registration is unnecessary. In this manner, location update traffic is minimized in an interworking system, such as GSM and ACeS, or more generically SA1 and SA2 illustrated in the figures.

As in FIG. 1, a series of numbers are depicted in FIG. 2, each number representing a corresponding step, as will be described hereinafter. As in the conventional system 8, the mobile station 10 recognizes a switch to a new system, i.e., from SA1 to SA2, and initiates an update request (circled step 1 as illustrated). VLR 26 then forwards the update request, including the new SAI, to the HLR 28, as described above (step 2). However, instead of processing and overwriting the "old" SAI and other information in location record 28A, as in the conventional embodiment, the HLR 28 of the present invention stores the "new" SAI and related information in a separate location record 28B (step 3), keeping the "old" information intact for later reference, such as upon returning to the home system. Acceptance is then forwarded by the HLR 28 to the MSC 24/VLR 26 (step 4) and to the mobile station 10 (step 5). No cancellation message is forwarded to MSC 12/VLR 14, however, as in FIG. 1. Accordingly, the mobile station 10 may now be paged within either or both systems through the respective MSC/VLR pairs in the dual system and the corresponding base stations therein (step 6).

Upon the return of the mobile station 10 to the original or home service area, i.e., SA1, the "old" subscriber information in the MSC 12/VLR 14 is still there. Accordingly, resubscription is unnecessary and the mobile station 10, being known, can pickup where it left off. It should be understood, however, that because of subscriber movement while within the co-terminus network, i.e., SA2, the mobile station 10 may now be located geographically remote from the position in SA1 where it was upon switching to SA2. Thus, a different MSC/VLR or different base station (or cell) within SA1 may be utilized as is understood by one skilled in the art.

A particular dual-mode ACeS/GSM (or other satellite-terrestrial) mobile station 10 may have a home subscription in either system, managed by a HLR 28 where current SAI and other information is stored. A mobile 10 served by a non-preferred network, say a mobile with an ACeS-based subscription operating in GSM, will preferably periodically attempt to return to or receive service within the preferred network, ACeS, the periodicity being implemented by a non-preferred-network internal timer within the mobile 10. The period of time in the internal timer being set to a given visitation time, which upon expiration thereof the mobile station 10 will attempt to return to the home network automatically. It should be understood, however, that the subscriber may manually initiate the return to the home system at any time. In accordance with the present invention, whenever a non-preferred network is used, i.e., an associated SAI is stored in record 28B of the HLR 28 for that subscriber, the HLR 28 initiates an associated timer 32 for that subscriber, e.g., to a default visitation time, by which upon expiration thereof, the mobile station may have returned home, as will be described more fully hereinafter.

For a satellite-based subscription, such as a subscriber within ACeS, when the mobile station 10 visits and registers in the alternate terrestrial-mode network, such as GSM, the SAI in GSM is stored within the associated record 28B in HLR 28 and the timer 32 initiated. It should be understood that the internal timer within the mobile station 10 is also initiated as described. When the mobile returns to ACeS after expiration of the aforementioned time period set in timer 32, the internal timer or otherwise, the ACeS SAI remains in record 28A and no LU is necessary. It should, therefore, be understood that those mobile stations 10, having associated records 28B in the HLR 28 and non-zero times remaining on timer 32, are most likely still visiting within the GSM network and are paged there first, then in ACeS. Alternatively, mobiles with associated records 28B and expired times are assumed to have returned to ACeS and are paged there first, then in GSM. The timer 32 is preferably re-started only after a subsequent successful GSM registration. If at any time the mobile station 10 responds to a page, initiates a call or causes a new LU in the ACeS network, then the associated record 28B is preferably released and the timer 32 cleared if still running. Thereafter, the mobile 10 is paged only in the ACeS network.

In this manner, the number of LUs within an ACeS or other limited-capacity network are kept to a minimum while maintaining subscriber pageability at all times. With proper setting of the non-preferred network timer 32 (and the internal timer also), dual-mode mobile stations 10 will be paged in only one of the dual networks most of the time, i.e., the paging system correctly selects the currently used network. It should be understood that the duration of time on timer 32 may be variable and could be a network decision based on local ACeS and GSM coverage and traffic characteristics and broadcasted as an ACeS parameter. The internal timer time may also vary accordingly.

Figure 3:
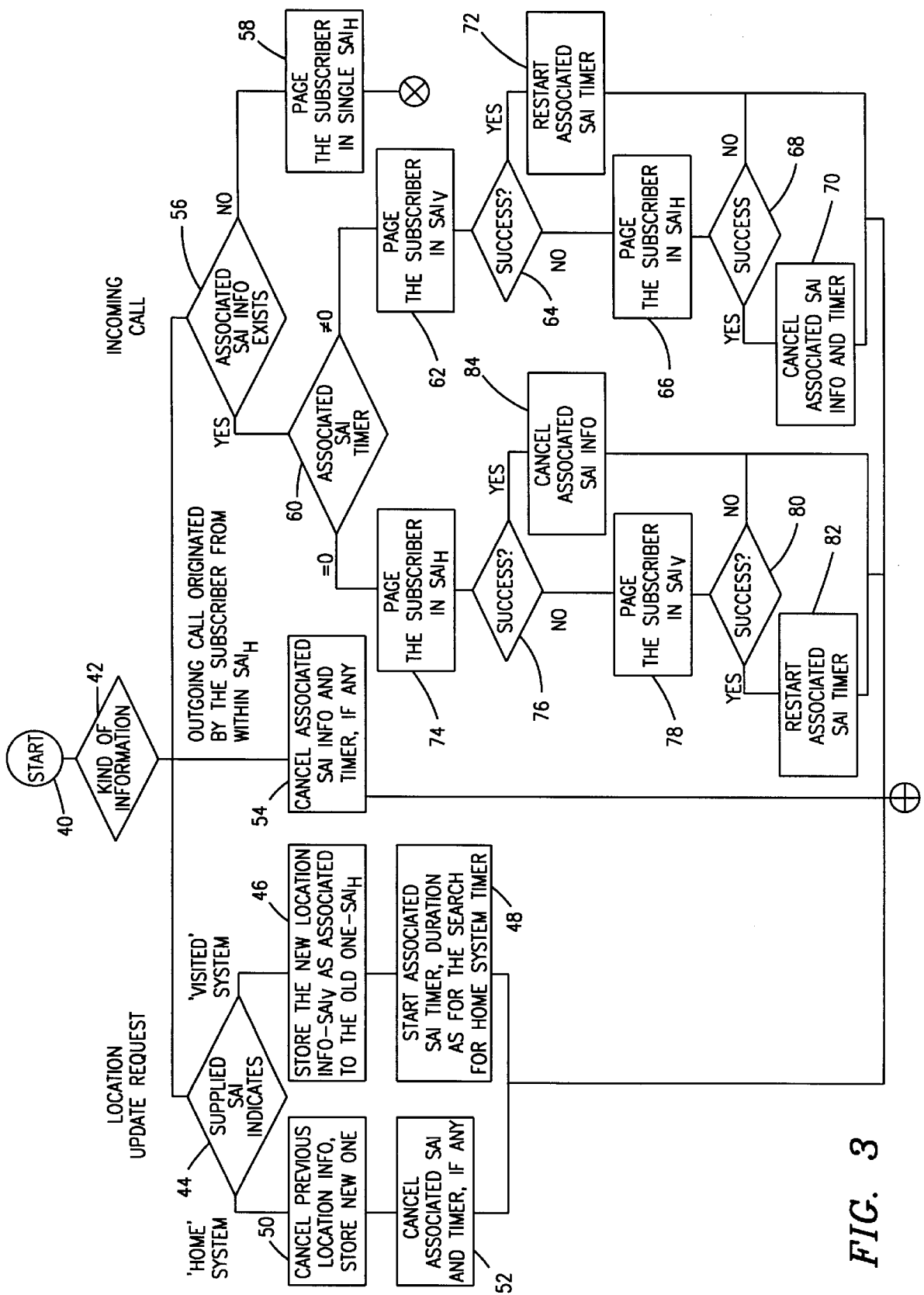
FIG. 3 is a flow chart representing the steps followed by the telecommunications system in handling various system access operations.

Shown in FIG. 3 is a flow diagram illustrating steps for location updating and paging processing in accordance with a satellite subscription embodiment of the present invention. As will be discussed in greater depth, the flow diagram describes three distinct operations performed in a dual-mode telecommunications system, such as system 30: location update requests, outgoing calls and incoming calls. Accordingly, when the HLR 28, as shown in FIG. 2, receives information (box 40), a determination (box 42) is made as to the kind of information received and control transferred to the appropriate operation, i.e., the aforementioned location update request (box 44), outgoing call (box 54), and incoming call (box 56).

If the HLR 28 receives a location update request information (step 2 as illustrated in FIG. 2), control in FIG. 3 is switched from box 42 to box 44. If the mobile station 10 for that ACeS subscriber is visiting another system, i.e., GSM, then the new location information, e.g., the SAI, is stored within the associated record 28B within HLR 28 (box 46). The SAI information for the old or "home" ACeS network remains stored in record 28A. The HLR 28 then sets and starts the aforedescribed associated non-preferred network timer 32 (box 48). Alternatively, if the mobile station 10 is within the home ACeS network, then the old ACeS SAI information in the home record 28A is overwritten (box 50) with the new ACeS data, and any associated SAI information in associated record 28B is released and the timer 32 cleared (box 52). In either case, the HLR 28 of the system 30 then awaits other information.

If the HLR 28 can receive and interpret information as related to an outgoing call from within the ACeS network, such as from mobile station 10 in SA2 in FIG. 2, then, as above, any visiting information is now meaningless and the any associated SAI information in associated record 28B is released and the timer 32 cleared (box 54). The HLR 28 then awaits other information.

Finally, if the HLR 28 receives an incoming call, control is transferred to box 56 where a determination is made whether the HLR 28 contains an associated SAI in record 28B. If not, then the subscriber is most likely still within ACeS and is paged in the home ACeS network alone (box 58). If record 28B contains SAI information, however, then the timer 32 is examined (box 60). If the timer 32 has not yet expired, i.e., the subscriber has only recently visited the alternate GSM network, then the subscriber most likely remains there and is first paged there first (box 62). This offers an advantage in possibly locating the subscriber in the GSM network before initiating a page in the more capacity-limited ACeS system. Control is then transferred to box 64 where a determination is made whether the aforesaid page in the visiting GSM network was successful. If the page failed, then the subscriber is paged in the home ACeS network (box 66) and control transferred to box 68 for a determination on the success of the home page. If not successful, then the HLR 28 forwards an error or non-connect message back to the calling party and awaits the next command. If, however, the home page was successful (box 66), i.e., the mobile station 10 is no longer visiting GSM and has returned to the home system, then any associated SAI information in associated record 28B is released and the timer 32 cleared (box 70). The HLR 28 then awaits another command. Alternatively, if the page in the visited GSM network was successful in box 64, then the timer 32 is re-initiated (box 72).

If, however, the timer 32 has expired (box 60), then the assumption is that the subscriber and the mobile station 10 either manually or automatically, respectively, has returned to the home system and is no longer visiting. Accordingly, the subscriber is first paged in ACeS (box 74) and control is transferred to box 76 where a determination is made whether the home page was successful. If not, then the subscriber is paged in GSM (box 78) and control transferred to box 80 where a determination is made whether the visiting page was successful. If the visiting page was not successful, then the HLR 28 forwards an error or non-connect message back to the call-originating party and awaits the next command. If, however, the visiting page was successful, i.e., the mobile station 10 is still in GSM, then the timer 32 is re-initiated (box 82), and the HLR 28 awaits another command. Alternatively, if the home page was successful (box 76), i.e., mobile station 10 has returned home, then the associated SAI information in associated record 28B is released (box 84), and the HLR 28 awaits another command.

For a terrestrial-based subscription, such as a GSM-based subscriber visiting ACeS, however, the situation is more difficult since no modifications can be made to the GSM standards. Thus, the HLR 28 and MSCs standards and protocols in a GSM network cannot be changed. Even though such GSM-based dual-mode subscriptions are expected to be in a minority, several approaches are nonetheless possible.

One such approach for a mobile station 10, of a GSM-based subscriber, temporarily roaming into ACeS or any other such satellite-based system, may be to start timer 32 and not attempt any location updates within the ACeS system until the time on timer 32 has elapsed. A further restriction could be that at least one prior attempt to return to GSM has failed, and only when these two conditions are satisfied will an LU be performed. It should be understood, however, that in such a case, i.e., non-contact with the GSM home system, the mobile station 10 will not be pageable until the ACeS LU is performed. When the LU is done, of course, the mobile station 10 is then instantly pageable.

Location updates may also be controlled through a broadcasted system variable or parameter, which can be used to enable or disable LUs for visitors, i.e., non-home subscribers, depending on the traffic conditions. For example, if an ACeS system has heavy traffic and LUs would be burdensome, then the system parameter could prevent LUs from visitors until the system is able to handle the load. Alternatively, the enable/disable system parameter can be used in conjunction with the aforedescribed timer 32. If disabled, a visiting subscriber within ACeS will not be able to register until the timer 32 has elapsed and at least one attempt of mobile station 10 to return to the GSM has failed. If enabled, GSM-based visitors will be permitted to perform an LU upon entering the system, if necessary. This approach allows maximum flexibility and is easy to implement as an ACeS-mode functionality in a dual-mode mobile. It should be understood that the aforementioned system parameter can be stored in a record or other data storage area within the mobile station 10 to govern the accessibility of location updates while the mobile station 10 is in a visiting system.

It should be understood that the interworking pair used to illustrate the aforedescribed dual-mode embodiment of the present invention, i.e., ACeS and GSM, are exemplary only and other interworking pairs are possible, e.g., ACeS and AMPS or any other such pair.

It should additionally be understood that the subject matter of the present invention ameliorates signaling difficulties due to excessive location updates in an alternate and single-mode embodiment of the invention, such as ACeS or any system where large numbers of such location updates can compromise the system. Accordingly, with reference again to FIG. 2, SA1 and SA2 may represent location areas or other such geographical divisions of a system, e.g., conventional locations areas or cells, within which a subscriber may roam in that system.

It should further be understood that the subject matter of the present invention is designed to ameliorate or overcome signaling difficulties caused by excessive location updates in any single-, dual- or multi-mode system where at least one of the systems therein has limited signaling capacity for non-speech communications. Although satellite-based systems primarily encounter such difficulties presently, any such limited system in a single-, dual- or multi-mode situation, whether satellite, terrestrial or combinations thereof, should be understood to be within the scope of this disclosure.

The previous description is of preferred embodiments for implementing the invention, and the scope of the invention should not necessarily be limited by this description. The scope of the present invention is instead defined by the following claims.

What is claimed is:

1. A telecommunications system for minimizing paging to a mobile station switching between said telecommunication system and a second telecommunication system, said telecommunication system comprising:

a home location register for handling information associated with said mobile station;

a first location record, within said home location register, for storing a first location of said mobile station when operating within said telecommunication system prior to said switching;

a second separate location record, within said home location register, for storing a second location of said mobile station when operating within said second telecommunication system after said switching, whereby said first location of said mobile station remains stored within said first location record after said mobile station switches to said second telecommunication system, and whereby when said mobile station switches back to said telecommunication system from said second telecommunication system said home location register does not resubscribe said mobile station; and an associated timer within said home location register, said associated timer being set upon transfer of said mobile station from said telecommunication system to said second telecommunication system, said mobile station initiating returning to said telecommunication system when the time on said associated timer has expired.

2. The telecommunications system according to claim 1, wherein said mobile station is single-mode and operable within said telecommunication system and said second telecommunication system.

3. The telecommunications system according to claim 2, wherein said single-mode mobile station is operable within a digital mobile satellite system.

4. The telecommunications system according to claim 3, wherein said digital mobile satellite system is an ACeS system.

5. The telecommunications system according to claim 2, wherein said telecommunication system is an earth-based system.

6. The telecommunications system according to claim 5, wherein said earth-based system is a GSM system.

7. The telecommunications system according to claim 1, wherein said mobile station is dual-mode, a first mode corresponding to said telecommunication system, a home telecommunication system in which said mobile station is based, and a second mode corresponding to said second telecommunication system.

8. The telecommunications system according to claim 7, wherein said second telecommunication system is substantially co-terminus with said home telecommunication system.

9. The telecommunications system according to claim 7, wherein said home telecommunication system corresponds to a digital mobile satellite system.

10. The telecommunications system according to claim 9, wherein said digital mobile satellite system is an ACeS system.

11. The telecommunications system according to claim 7, wherein said second telecommunications system corresponds to a digital mobile satellite system.

12. The telecommunications system according to claim 7, wherein said second telecommunication system corresponds to an earth-based system.

13. The telecommunications system according to claim 12, wherein said earth-based system is a GSM system.

14. The telecommunications system according to claim 7, wherein said home telecommunication system corresponds to an earth-based system and said second telecommunication system is a digital mobile satellite system.

15. The telecommunications system according to claim 14, wherein said earth-based system is a GSM system and said digital mobile satellite system is an ACeS system.

16. The telecommunications system according to claim 1, wherein said mobile station is multi-mode, a first mode corresponding to said telecommunication system, a home telecommunication system in which said mobile station is based, and a plurality of other modes each corresponding to a respective another telecommunication system.

17. The telecommunications system according to claim 16, wherein at least one of said respective another of said plurality of telecommunication systems is substantially co-terminus with said home telecommunication system.

18. The telecommunications system according to claim 1, wherein said first and second location comprises a first and second Service Area Identity, respectively.

19. The telecommunications system according to claim 1, wherein pages to said mobile station are forwarded by said home location register through said second telecommunication system when said associated timer is running.

20. The telecommunications system according to claim 19, wherein subsequent pages to said mobile station are forwarded by said home location register through said telecommunication system.

21. The telecommunications system according to claim 1, wherein pages to said mobile station are forwarded by said home location register through said telecommunication system when the time on said associated timer has expired.

22. The telecommunications system according to claim 21, wherein subsequent pages to said mobile station are forwarded by said home location register through said second telecommunication system.

23. The telecommunications system according to claim 1, further comprising an internal timer within said mobile station, said internal timer being set upon transfer of said mobile station from said telecommunication system to said second telecommunication system, wherein said mobile station initiates returning to said telecommunication system when the time on said internal timer has expired.

24. The telecommunications system according to claim 1, wherein said home location register forwards pages to said mobile station through said second telecommunication system when said second location record is present.

25. The telecommunications system according to claim 1, wherein said telecommunication system includes a system parameter therein corresponding to the ability of the telecommunication system to handle a location update, said system parameter when set preventing said mobile station from performing a location update when leaving said telecommunication system to said second telecommunication system.

26. A method for minimizing paging to a mobile station switching between a first and a second telecommunication system, said method comprising the steps of:

registering said mobile station within a home location register associated with said first telecommunication system, said home location register storing therein, in a first location record, a first location of said mobile station when operating within said first telecommunication system prior to said switching;

transmitting, upon a switch by said mobile station from said first telecommunication system to said second telecommunication system, from said mobile station to said home location register a second location of said mobile station after said switching, said home location register storing therein, in a second separate location record, a second location of said mobile station after said switching, whereby said first location of said mobile station remains stored within said first location record after said mobile station switches to said second telecommunication system, and whereby, when said mobile station switches back to said first telecommunication system from said second telecommunication system, said home location register does not resubscribe said mobile station, said home location register including an associated timer therein, said associated timer being set upon transfer of said mobile station from said first telecommunication system to said second telecommunication system, said mobile station initiating returning to said first telecommunication system when the time in said associated timer has expired.

27. The method according to claim 26, further comprising the step of:

resuming, upon a switch by said mobile station from said second telecommunication system to said first telecommunication system, operation of said mobile station within said first telecommunication system using said first location stored in said first location record.

28. The method according to claim 26 further comprising the step of:

paging, through said home location register, said mobile station within said second telecommunication system when said associated timer is running.

29. The method according to claim 28, wherein subsequent paging to said mobile station is forwarded by said home location register through said first telecommunication system.

30. The method according to claim 26 further comprising the step of:

paging, through said home location register, said mobile station within said first telecommunication system when the time on said associated timer has expired.

31. The method according to claim 30, wherein subsequent paging to said mobile station is forwarded by said home location register through said second telecommunication system.

32. The method according to claim 26, wherein said mobile station includes an internal timer therein, said internal timer being set upon the transfer of said mobile station from said first telecommunication system to said second telecommunication system, further comprising the step of:

returning to said first telecommunication system when the time on said internal timer has expired.

33. The method according to claim 26, wherein said mobile station is single-mode and operable within said first and second telecommunication systems.

34. The method according to claim 33, wherein said single-mode mobile station is operable within a digital satellite system.

35. The method according to claim 34, wherein said digital satellite system is an ACeS system.

36. The method according to claim 26, wherein said mobile station is dual-mode, a first mode corresponding to said first telecommunication system, a home telecommunication system in which said mobile station is based, and a second mode corresponding to said second telecommunication system.

37. The method according to claim 36, wherein said second telecommunication system is substantially co-terminus with said home telecommunication system.

38. The method according to claim 36, wherein said home telecommunication system corresponds to a digital mobile satellite system and said second telecommunication system is an earth-based system.

39. The method according to claim 38, wherein said digital mobile satellite system is an ACeS system and said earth-based system is a GSM system.

40. The method according to claim 36, wherein said home telecommunication system is an earth-based system and said second telecommunication system is a digital mobile satellite system.

41. The method according to claim 40, wherein said earth-based system is a GSM system and said digital mobile satellite system is an ACeS system.

42. The method according to claim 26, wherein said mobile station is multi-mode, a first mode corresponding to said first telecommunication system, a home telecommunication system area in which said mobile station is based, and a plurality of other modes each corresponding to a respective another telecommunication system.

43. The method according to claim 42, wherein at least one of said another telecommunication system is substantially co-terminus with said home telecommunication system.

44. The method according to claim 26, wherein said first telecommunications system includes a system parameter therein corresponding to the ability of the first telecommunication system to handle a location update, said system parameter when set preventing said mobile station from performing a location update when leaving said first telecommunication system to said second telecommunication system.

45. A telecommunications system for minimizing paging to a mobile station switching between said telecommunication system and a second telecommunication system, said telecommunication system comprising:

a home location register for handling information associated with said mobile station;

a first location record, within said home location register, for storing a first location of said mobile station when operating within said telecommunication system prior to said switching;

a second separate location record, within said home location register, for storing a second location of said mobile station when operating within said second telecommunication system after said switching, whereby said first location of said mobile station remains stored within said first location record after said mobile station switches to said second telecommunication system, and whereby when said mobile station switches back to said telecommunication system from said second telecommunication system said home location register does not resubscribe said mobile station; and an internal timer within said mobile station, said internal timer being set upon transfer of said mobile station from said telecommunication system to said second telecommunication system, wherein said mobile station initiates returning to said telecommunication system when the time on said internal timer has expired.

46. The telecommunications system according to claim 45, wherein said mobile station is dual-mode, a first mode corresponding to said telecommunication system, a home telecommunication system in which said mobile station is based, and a second mode corresponding to said second telecommunication system.

47. The telecommunications system according to claim 46, wherein said second telecommunication system is substantially co-terminus with said home telecommunication system.

48. The telecommunications system according to claim 46, wherein said home telecommunication system corresponds to a digital mobile satellite system.

49. The telecommunications system according to claim 48, wherein said digital mobile satellite system is an ACeS system.

50. The telecommunications system according to claim 46, wherein said second telecommunications system corresponds to a digital mobile satellite system.

51. The telecommunications system according to claim 46, wherein said second telecommunication system corresponds to an earth-based system.

52. The telecommunications system according to claim 51, wherein said earth-based system is a GSM system.

53. The telecommunications system according to claim 46, wherein said home telecommunication system corresponds to an earth-based system and said second telecommunication system is a digital mobile satellite system.

54. The telecommunications system according to claim 53, wherein said earth-based system is a GSM system and said digital mobile satellite system is an ACeS system.

55. The telecommunications system according to claim 45, wherein pages to said mobile station are forwarded by said home location register through said second telecommunication system when said internal timer is running.

56. The telecommunications system according to claim 55, wherein subsequent pages to said mobile station are forwarded by said home location register through said telecommunication system.

57. The telecommunications system according to claim 45, wherein pages to said mobile station are forwarded by said home location register through said telecommunication system when the time on said internal timer has expired.

58. The telecommunications system according to claim 57, wherein subsequent pages to said mobile station are forwarded by said home location register through said second telecommunication system.

59. The telecommunications system according to claim 45, wherein said home location register forwards pages to said mobile station through said second telecommunication system when said second location record is present.

60. The telecommunications system according to claim 45, wherein said telecommunication system includes a system parameter therein corresponding to the ability of the telecommunication system to handle a location update, said system parameter when set preventing said mobile station from performing a location update when leaving said telecommunication system to said second telecommunication system.

61. A method for minimizing paging to a mobile station switching between a first and a second telecommunication system, said method comprising the steps of:

registering said mobile station within a home location register associated with said first telecommunication system, said home location register storing therein, in a first location record, a first location of said mobile station when operating within said first telecommunication system prior to said switching; and transmitting, upon a switch by said mobile station from said first telecommunication system to said second telecommunication system, from said mobile station to said home location register a second location of said mobile station after said switching, said home location register storing therein, in a second separate location record, a second location of said mobile station after said switching, whereby said first location of said mobile station remains stored within said first location record after said mobile station switches to said second telecommunication system, and whereby, when said mobile station switches back to said first telecommunication system from said second telecommunication system, said home location register does not resubscribe said mobile station, said mobile station including an internal timer therein, said internal timer being set upon the transfer of said mobile station from said first telecommunication system to said second telecommunication system; and returning to said first telecommunication system when the time on said internal timer has expired.

62. The method according to claim 61, wherein said home location register includes an associated timer therein, said associated timer being set upon transfer of said mobile station from said first telecommunication system to said second telecommunication system, further comprising the step of:

paging, through said home location register, said mobile station within said second telecommunication system when said associated timer is running.

63. The method according to claim 62, wherein subsequent paging to said mobile station is forwarded by said home location register through said first telecommunication system.

64. The method according to claim 61, wherein said home location register includes an associated timer therein, said associated timer being set upon transfer of said mobile station from said first telecommunication system to said second telecommunication system, further comprising the step of:

paging, through said home location register, said mobile station within said first telecommunication system when the time on said associated timer has expired.

65. The method according to claim 64, wherein subsequent paging to said mobile station is forwarded by said home location register through said second telecommunication system.

66. The method according to claim 61, wherein said mobile station is dual-mode, a first mode corresponding to said first telecommunication system, a home telecommunication system in which said mobile station is based, and a second mode corresponding to said second telecommunication system.

67. The method according to claim 66, wherein said second telecommunication system is substantially co-terminus with said home telecommunication system.

68. The method according to claim 66, wherein said home telecommunication system corresponds to a digital mobile satellite system and said second telecommunication system is an earth-based system.

69. The method according to claim 68, wherein said digital mobile satellite system is an ACeS system and said earth-based system is a GSM system.

70. The method according to claim 66, wherein said home telecommunication system is an earth-based system and said second telecommunication system is a digital mobile satellite system.

71. The method according to claim 70, wherein said earth-based system is a GSM system and said digital mobile satellite system is an ACeS system.

72. The method according to claim 61, wherein said telecommunications system includes a system parameter therein corresponding to the ability of the system to handle a location update, said system parameter when set preventing said mobile station from performing a location update when leaving said first telecommunication system to said second telecommunication system.

* * * * *